Dec. 2, 1947.                J. A. LAUCK ET AL                 2,431,944
                           SELECTOR VALVE ASSEMBLY
                           Filed March 6, 1944              2 Sheets-Sheet 1
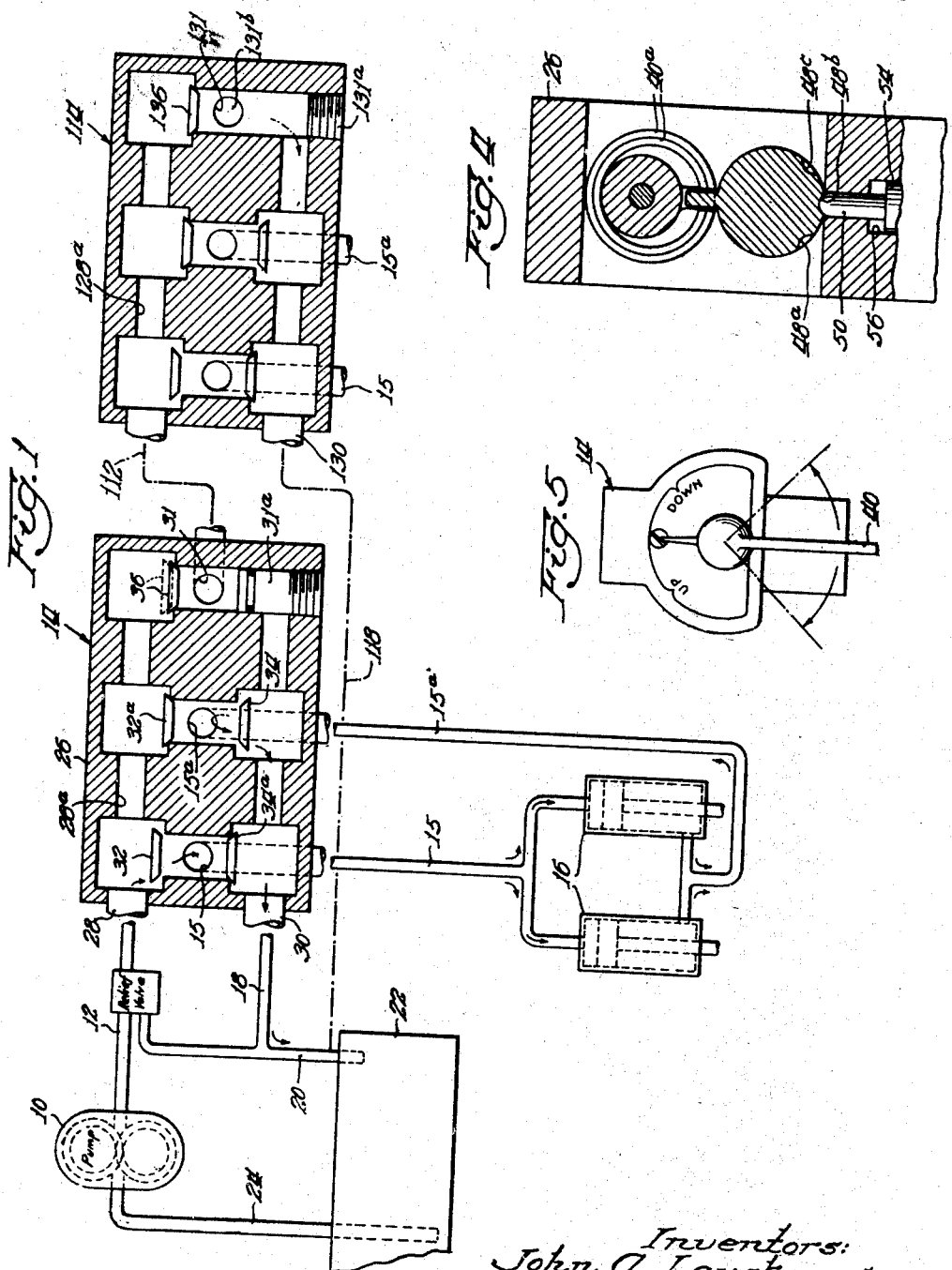
Inventors:
John A. Lauck and
Ray G. Holt

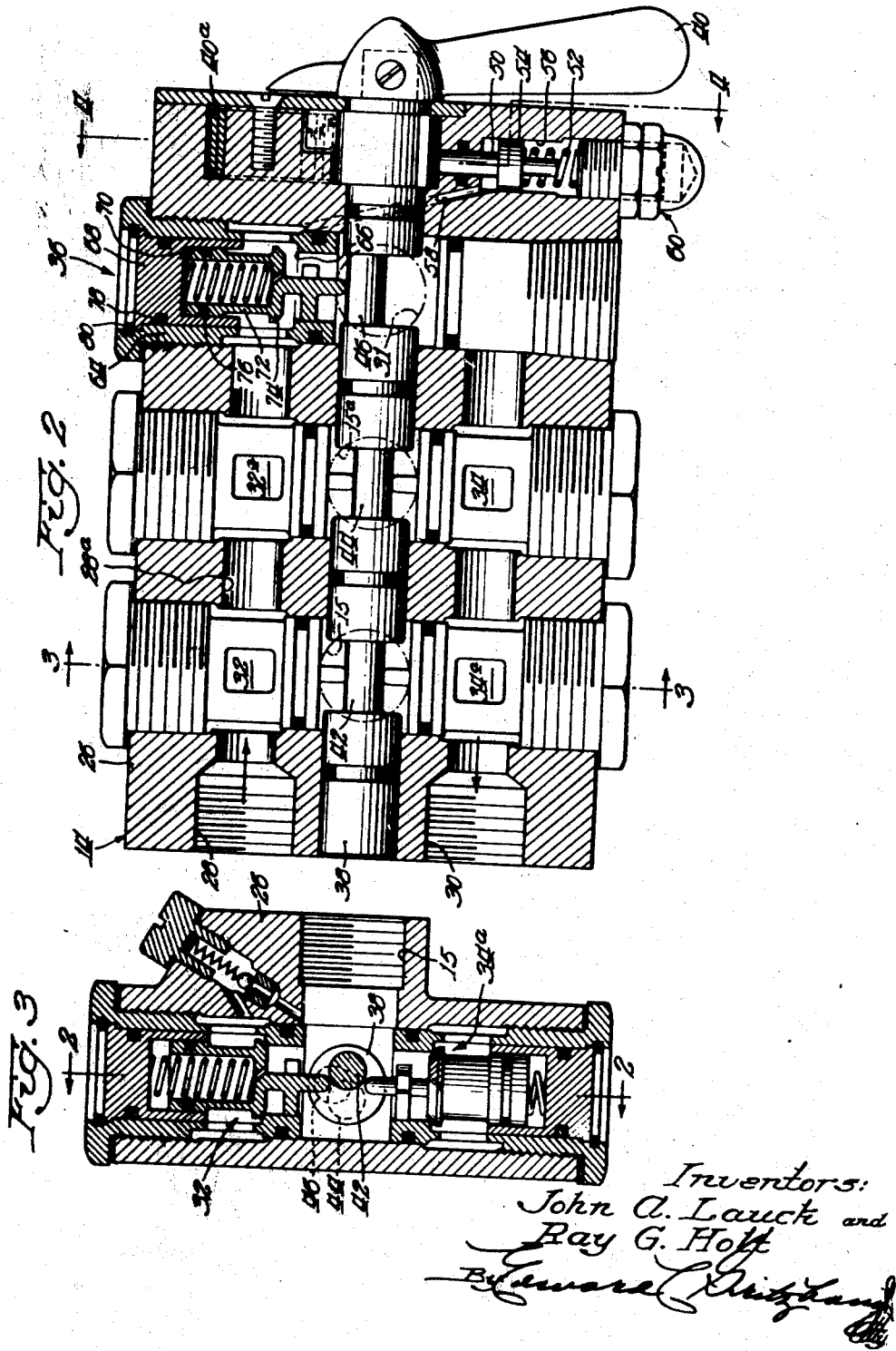

Patented Dec. 2, 1947

2,431,944

UNITED STATES PATENT OFFICE 2,431,944

SELECTOR VALVE ASSEMBLY

John A. Lauck, South Euclid, and Ray G. Holt, Euclid, Ohio, assignors, by mesne assignments, to Borg-Warner Corporation, Chicago, Ill., a corporation of Illinois Application March 6, 1944, Serial No. 525,268

5 Claims. (Cl. 60—52)

1

This invention relates to arrangements for selectively delivering operating pressure fluid from a continuously operating fluid pressure generator to a pressure fluid responsive motor and unloading the generator at such times as operation of the motor is not desired.

It has been the previous practice particularly in aircraft installations to employ a pressure accumulator, a pressure generator and an associated pressure unloading valve for maintaining a predetermined range of pressures in the accumulator for the purpose of operating the various instrumentalities about the aircraft. Such arrangements have been found to have certain very unsatisfactory operating characteristics and it is the principal object of this invention to provide a novel arrangement making possible the elimination of the accumulator and associated intricate unloading valve and in lieu thereof, deliver pressure fluid from the continuously operating pressure fluid generator through a special selector and unloading valve arrangement to the pressure responsive motive means to be operated thereby.

A more particular object is the provision of an arrangement of the present type which is selectively effective to direct the pressure fluid from the constantly operating pressure fluid generator to the pressure responsive motive means, at such times as it is desired to operate the same, and at other times to unload the pressure generator or in other words, provide for the free and unobstructed flow of pressure from the outlet of the pressure generator back to the inlet thereof. Another particular object is the provision of a selector valve assembly effective by the operation of a single manual lever to a selected position to effect the building up of the outlet pressure from the fluid pressure generator and the selective delivery thereof to the inlet of a pressure responsive motive means and the return thereof to the inlet of said generator, together with the provision of an arrangement effective upon the delivery to said pressure responsive motive means of a predetermined value of pressure to cause the return of the manual lever to its neutral position, the shutting off of pressure communication to the motive means and the unloading of the pressure generator.

A still further object is the provision of a special arrangement of a plurality of the above selector valve assemblies in series in such a manner that the operator may turn on a plurality of the manual levers at the same time and the responsive motive means will be operated in a predetermined sequence without any over-lapping of the operation thereof which might lower the operating pressure delivered by said pressure generator below a safe level.

The above and other objects, advantages, and uses of my invention will become apparent from

2 a reading of the following specification taken in connection with the accompanying drawings which form a part thereof and wherein:

Fig. 1 is a schematic view of a typical system incorporating an embodiment of the present invention;

Fig. 2 is an enlarged axial cross-sectional view taken substantially on the line 2—2 of Fig. 3 and showing one preferred embodiment of the invention;

Fig. 3 is a transverse cross-sectional view taken substantially on line 3—3 of Fig. 2;

Fig. 4 is a broken away sectional view taken substantially on line 4—4 of Fig. 2, bringing out to advantage the special pressure responsive detent arrangement for releasably restraining the manual lever in the several selectable positions thereof; and Fig. 5 is an elevational view showing the several positions to which the manual lever may be operated to effect selective operation of the pressure responsive motor.

Referring in greater detail to the figures of the drawing and first to Fig. 1, it will be seen that the present invention contemplates essentially the provision of a constantly driven pressure fluid generator 10 delivering through a conduit 12 to a special distributor valve assembly indicated generally at 14, effective to selectively direct pressure through conduits 15 and 15a to a pressure responsive motor or motors indicated generally at 16 for operation in selected directions and return pressure fluid through conduits 18 and 20 to the sump tank 22 from which it may be again picked up by conduit 24 for return to pressure fluid generator 10.

The present invention is particularly directed toward the novel arrangement composing the distributor valve assembly 14 and its contemplated mode of coaction with the constantly driven pressure fluid generator and pressure responsive motor 16.

Pressure distributor valve assembly 14 is effective to either completely unload the pressure from the outlet of pressure fluid generator 10 permitting the free flow thereof back to sump tank 22 or alternatively to cause the pressure of the fluid delivered by the fluid generator 10 to be built up to a sufficient value to operate the pressure responsive motive means 16 and selectively delivering this pressure fluid to either side of the motive means for operation in the desired direction, the pressure fluid on the other side of the motive means being conducted back to the sump tank 22.

Referring to Figs. 1 through 5 it will be seen that distributor valve 14 includes a housing 26 having an inlet 28, a first outlet 30 leading back to sump tank 22 and a second outlet 31 leading to an additional distributor valve unit 114 of similar construction and in series with distributor valve unit 14. A first pressure delivery valve 32 directs pressure fluid through conduit 15 to motive means 16, while a first pressure fluid return valve 34 returns pressure fluid from the other side of motive means 16 through conduit 15a, first outlet 30 and conduit 18 for operation of the motive means in one direction. A second pressure fluid delivery valve 32a is effective when open to deliver pressure through conduit 15a to the pressure responsive motive means 16 for operation in the opposite direction while a second pressure fluid return valve 34a is effective when open to return pressure fluid from the motive means 16 through conduit 15 first outlet 30 and conduit 18 to the sump tank 22. The respective pairs of delivery and return valves are alternately operable depending upon the direction in which it is desired to operate the pressure responsive motive means 16. It is important to note that when pressure fluid is not to be delivered to the pressure responsive motive means 16, all of the delivery and return valves are closed to lock or entrap such fluid as has been delivered to the respective opposite sides of the motive means to prevent the movement thereof in either direction. It is only when it is desired to operate the motive means 16 that the selected delivery and return valves are operated and then these valves are maintained open only until the desired movement of the motive means has been accomplished whereupon all of these valves are closed to entrap the fluid on the opposite sides of the motive means and lock the same in position.

In order to make possible the above operation of the delivery and return valves and to accomplish this with a direct delivery of pressure fluid for a constantly operating pressure fluid generator, it is necessary to provide means taking care of two controlling factors. First, the generator must be relieved of substantially all back pressure except at such times as actual work operation of the pressure responsive motive means 16 is required. Secondly, at such time as operation of the motive means is required, it is necessary that the generated pressure be built up to a value effective to drive the motive means. To accomplish this function, there is provided an unloading valve 36 and a special arrangement for operating this valve in correlated relation to the delivery and return valves which arrangement takes into consideration the above factors. A cam shaft 38 has a manually adjustable lever 40 drivingly connected with one end thereof so that an operator may move this lever arcuately from a central or neutral position to either of two selected positions designated up and down on Fig. 5, against the action of return spring 40a. This cam shaft is formed with a first cam 42 effective upon the operation of the manual lever 40 to the up position for operating pressure delivery valve 32 to the open position and effective upon the alternate movement of manual lever 40 to the down position to open return valve 34a to the open position thereof. A second cam 44 on cam shaft 38 is simultaneously operable with the operation of manual cam lever 40 to likewise selectively operate pressure delivery valve 32a or pressure return valve 34. It will be noted that cams 42 and 44 operate only one of the respective valves associated therewith, while leaving the other in closed position. It will be further noted that cams 42 and 44 effect the return of all of the delivery and flow return valves to closed position and the maintenance of the same in such closed position when manual lever 40 is in the center or neutral position thereof. A third cam 46 is formed on cam shaft 38 in such a manner that when manual lever 40 is moved to neutral position this cam is effective to open unloading valve 36 and maintain the same in such open position to provide for free flow of fluid from the generator outlet back to the sump tank or generator inlet. Movement of manual lever 40 to either the up or the down position thereof on either side of neutral is effective to cause the closing of unloading valve 36 and the building up of pressure delivered by pressure generator to the value necessary for the operation of the pressure responsive motive means 16.

In order that the manual lever 40 may be moved to either of its operating positions and require no further attention from the pilot or operator, there is provided a special arrangement for maintaining the lever in the operated position until a sufficiently high pressure is generated by the pressure generator to indicate that the desired movement of the pressure responsive motive means 16 has been accomplished, whereupon the manual selector lever 40 is automatically returned to the neutral position effecting the reopening of the unloading valve 36 and the closing and maintenance in closed position of all of the delivery and return valves to thus entrap the pressure fluid on both sides of the pressure responsive motive means 16 and lock the same in the position to which it has been moved. Cam shaft 38 is further formed with a plurality of sockets or recesses disposed arcuately thereabout in positions corresponding to the several positions of lever 40 these including recess 48a corresponding to the up position of lever 40, recess 48b corresponding to the neutral position, and recess 48c corresponding to the down position of cam shaft 38. Engageable with these respective recesses is a detent or plunger 50 urged in the direction of cam shaft 38 by means of compression spring 52. For the purpose of withdrawing plunger 50 from the detent socket there is provided a piston 54 operable in a cylinder 56. Passage 58 places piston 54 in communication with the inlet manifold 28a to render piston 54 responsive to the pressure built up in the inlet manifold. Compression coil spring 52 is adjustable by means of nut assembly 60 to predetermine the pressure in response to which piston 54 will withdraw detent plunger 50 from the respective sockets 48a and 48c. The value of pressure for which control compression spring 52 is set, is sufficiently in excess of the normal value of the pressure required to operate pressure responsive motive means 16 with the requisite factor of safety, the development of such pressure indicating that the motive means has performed its work and reached the end of the required travel thereof whereupon piston 54 operates to withdraw detent or plunger 50 from the associated restraining socket rendering return spring 40a effective to move manual control lever 40 to neutral position.

To further facilitate the operation of the valves by means of the cams 42, 44, 46 requiring only a relatively small torque applied either through manual lever 40 or applied by spring 52, all of the valves are constructed in a manner rendering the same substantially completely balanced to pressure. In other words, all of the surfaces on the inlet valves which tend to move the same in the closed direction are balanced to inlet pressure in the inlet manifold 28a by being provided with corresponding or equivalent surfaces urging the valves in the opposite direction. This very desirable balanced construction of the valves forms the subject matter of a separate patent application and no specific claim is made thereto aside from the present combination. It is essential for the purpose of the present case to note that all of the valves are identical and include an externally threaded sleeve insert 64 formed with a valve seat 66 and receiving a closure piston-like member 68 in turn formed with a cylindrical chamber 70 having the same diameter as that of seat 66 and receiving a piston portion 72 extending rearwardly from the back face of the valve proper 74. A donut seal 76 is interposed between the piston 72 and the cylinder 70, as well as a donut seal 78 being interposed between the closure member 68 and its supporting sleeve. Closure member 68 is confined in installed position by means of a snap ring 80.

It is important in connection with the present invention to note the novel manner in which a plurality of distributor valve assemblies are arranged in series to supply a corresponding plurality of motive means in succession. Referring again to Fig. 1, outlet 31 from the first distributor valve assembly 14 of the series leads through conduit 112 to inlet manifold 128a of the second distributor valve assembly 114 of the series. It is important that the outlet 31 be disposed below unloading and loading valve 36 in the relation shown in order that the second distributor valve assembly 114 be under the control of the unloading and loading valves 36. It will be apparent that as many successive distributor valve assemblies as desired may be placed in series by arranging the outlet from a preceding distributor valve assembly to a succeeding one in the manner described in connection with outlet 31 of first distributor valve 14. Return fluid is led from each distributor valve assembly back to the sump tank through lines corresponding to line 18 for the first distributor valve assembly 14 and line 118 shown dotted for the second distributor valve assembly 114. In order to render the units 14 and 114 readily applicable for either individual or series installation it is merely necessary to selectively employ a long or a short threaded closure plug in cooperation with unloading valve 36. A long threaded closure plug 31a functions to properly close off the outlet from unloading valve 36 of housing 14 and prevents the same from returning through line 18 to sump tank 22 thus forcing the discharge from valve 36 to pass through outlet 31 and line 112 to the second distributor valve 114. On the other hand, the final or end distributor valve unit 114 is provided with a short threaded closure plug 131a allowing the discharge from distributor valve 136 to pass through the housing outlet 130 and return line 118 back to the sump tank 22. An additional closure 131b prevents fluid from valve 136 being discharged from the outlet 131. It will readily appear that in the event it is desired to add an additional unit in series, then short plug 131a will be replaced by a longer closure plug similar to 31a and closure 131b will be removed and port 131 will be connected to the inlet manifold of such subsequent distributor valve unit.

From the above it will be seen that where a plurality of distributor valve units such as 14 and 114 are connected in series, the pilot or operator may turn all of the operating handles corresponding to handle 40 to on position in the selected direction and the respective units will operate in sequence with no over-lapping of operation of the respective units. In other words, the first unit closest to the generator will first operate to deliver the requisite pressure through the distributor valve to the motor associated therewith and by virtue of the fact that unloading valve 36 is closed, no fluid will be delivered to subsequent units until the manual lever 40 has been automatically returned to neutral position by the operation of piston 54 and spring 40a. Following the return of manual lever 40 to neutral position and the opening of unloading valve 36 pressure will then be delivered through conduit 12 to the second distributor valve assembly 114 in series and by virtue of the fact that unloading valve 136 is closed, and the selected distributor valve opened pressure fluid will be delivered to the second motor unit (not shown). This sequence of operation will be repeated for each distributor valve assembly in series.

While our invention has been disclosed in connection with certain specific embodiments thereof, it is to be understood that this is by way of example and not limitation and that our invention is to be defined by the appended claims.

We claim:

1. An arrangement for controlling the selected delivery of fluid pressure from a continuously driven fluid pressure generator to an intermittently operated fluid pressure responsive motor and returning the same to the inlet of said generator, said arrangement including means defining a pair of alternatively operable selector valves effective when open to deliver pressure from said generator to the respective sides of said motor, means defining a pair of alternatively operable return valves effective when open to return pressure fluid from the opposite side of said motor to said generator inlet, all of said valves being normally in the closed position, entrapping fluid on both sides of said motor, means defining a generator loading and unloading valve effective when open to by-pass pressure fluid from the inlet of said generator around said selector delivery valves back to the inlet of said generator and effective when closed to cause said generator to build up pressure for delivery to said selector delivery valves, said loading and unloading valve being normally in the open position, rotatable manual means effective to simultaneously operate a selected delivery valve and return valve to the open position thereof while moving said loading and unloading valve to the closed position thereof, locking means maintaining said rotatable manual means in selected positions comprising a cylinder, a piston-like detent reciprocable in said cylinder, spring means urging said detent into locking position with respect to said rotatable manual means, means supplying fluid pressure to said cylinder for effecting movement of said detent in a direction to unlock said rotatable manual means, and means adapted to return said rotatable manual means to a neutral position upon withdrawal of said detent.

2. An arrangement for controlling the selective delivery of pressure fluid from a continuously driven fluid pressure generator to an intermittently operated pressure fluid responsive motor and returning said fluid to the inlet of said generator, said arrangement including means defining a first delivery valve and a first return valve for respectively delivering pressure to a first side of said motor and returning pressure fluid from the opposite side of said motor to the inlet of said generator, means defining a second delivery valve and a second return valve effective respectively to deliver pressure fluid to the side of said motor opposite to that served by said first delivery valve and to return pressure from said first side to said pressure generator inlet, all of said delivery and return valves being normally in the closed position locking pressure fluid on both sides of said motor for holding said motor in the position to which the same has been operated, means defining a generator loading and unloading valve effective when open to by-pass pressure fluid from the outlet of said generator back to the inlet of said generator and effective when closed to cause said generator to build up pressure for delivery by said delivery valves, arcuately adjustable manual means rotatably movable in opposite directions and effective to selectively operate either said first delivery valve or said second delivery valve and the corresponding return valve to the open positions thereof as well as to operate said loading and unloading valve to the closed position thereof a cylinder, a piston-like detent adapted for reciprocation in said cylinder, spring means urging said detent into locking relation with said manual means, means responsive to the development of a predetermined delivery pressure for automatically releasing said detent from said manual means, and positive acting spring means for effecting the return of said manual means to neutral position opening said loading and unloading valve and closing said delivery and return valves.

3. An arrangement for controlling the selective delivery of fluid pressure from a continuously operating fluid pressure generator to an intermittently operated fluid pressure responsive motor and returning the same to the inlet of said generator, said arrangement including means defining a first delivery valve balanced to inlet pressure for delivering pressure to a first side of said motor for operation in one direction, means defining a first return valve for returning pressure from a second side of said motor back to said pressure generator, means defining a second delivery valve balanced to inlet pressure effective to deliver pressure to the said second side of said motor for operation in the opposite direction, and means defining a second return valve for returning pressure from said first side of said motor to said generator, means defining an unloading valve balanced against inlet pressure from said generator effective when open to unload said pressure generator from the outlet back to the inlet thereof and effective when closed to cause said generator to build up pressure for delivery to said delivery valves, rotatable manual means effective by movement in opposite arcuate directions beyond a neutral position to selectively operate said first delivery valve and first return valve or said second delivery valve and said second return valve, depending upon the direction in which it is desired to operate said motor, said unloading valve being operable by said manual means to closed position in either direction of movement thereof away from neutral position to cause said generator to build up the requisite pressure and deliver the same to said motor, a cylinder, a piston-like detent adapted for reciprocation in said cylinder, spring means urging said detent into locking relation with said manual means means responsive to the development of a predetermined maximum pressure by said fluid generator effective to automatically release said detent from said manual means, and positive acting spring means for returning said manual means to the neutral position causing the opening of said unloading valve to unload said generator and effective to move said delivery and return valves to closed position entrapping fluid pressure on both sides of said motor for holding the same in the position to which it has been moved.

4. An arrangement for controlling the selective delivery of pressure fluid from a continuously driven fluid pressure generator to an intermittently operated fluid pressure responsive motor and returning the fluid to the inlet of said generator, said arrangement comprising an elongated housing having spaced longitudinal bores defining inlet and return manifolds arranged with their axes parallel and communicating respectively with inlet and outlet ports in said housing; an intermediate longitudinal bore in said housing defining a shaft bearing with its axis parallel with said manifolds; a plurality of pairs of valve assemblies, a valve in each pair being balanced against inlet pressure from said generator and being arranged to operate in opposition to the other valve of the same pair for controlling the respective inlet and return manifolds; a shaft rotatable in said bearing bore, said shaft having a plurality of cam elements each of which is adapted to alternatively operate the respective valves of each pair of valves; unloading valve means balanced against inlet pressure from said generator and adapted to be opened by a cam on said shaft, whereby said unloading valve is effective to unload fluid pressure from said inlet manifold; manual means operable in opposite directions for rotating said shaft from a neutral position to a position to effect selective operation of each of the aforesaid valves; locking means for releasably maintaining said shaft in any of its selected positions; fluid pressure actuated means responsive to predetermined generator pressure for releasing said locking means; and positive acting spring means for returning said shaft to neutral position upon the release of said locking means by said fluid pressure actuated means.

5. An arrangement as defined in claim 4, wherein the shaft locking and releasing means comprise a cylinder, a piston-like detent adapted for reciprocation in said cylinder, spring means urging said detent into shaft-locking position, and means supplying fluid pressure to said cylinder for moving the detent in a direction to unlock the shaft.

JOHN A. LAUCK.
RAY G. HOLT.

REFERENCES CITED

The following references are of record in the file of this patent:

UNITED STATES PATENTS

| Number | Name | Date |
| --- | --- | --- |
| 1,461,010 | Amdursky | July 3, 1923 |
| 1,938,869 | Shimerda | Dec. 12, 1933 |
| 2,225,082 | Orshansky | Dec. 17, 1940 |
| 2,243,364 | Trautman | May 27, 1941 |
| 2,275,963 | Herman | Mar. 10, 1942 |
| 2,276,979 | Jacobi | May 17, 1942 |
| 2,319,486 | Austin | May 18, 1943 |
| 2,349,069 | Ashton | May 16, 1944 |
| 2,376,322 | Benaway | May 22, 1945 |